(12) United States Patent
Ackland

(10) Patent No.: US 7,326,903 B2
(45) Date of Patent: Feb. 5, 2008

(54) MIXED ANALOG AND DIGITAL PIXEL FOR HIGH DYNAMIC RANGE READOUT

(75) Inventor: Bryan Ackland, Old Bridge, NJ (US)

(73) Assignee: Noble Peak Vision Corp., Wakefield, MA (US)

(*) Notice: Subject to any disclaimer, the term of this patent is extended or adjusted under 35 U.S.C. 154(b) by 0 days.

(21) Appl. No.: 11/427,483

(22) Filed: Jun. 29, 2006

(65) Prior Publication Data

US 2008/0001065 A1  Jan. 3, 2008

(51) Int. Cl.
- H01L 27/00 (2006.01)
- G01J 1/44 (2006.01)
- H03K 17/78 (2006.01)
- H04N 3/14 (2006.01)
- H03M 1/12 (2006.01)

(52) U.S. Cl. .............. 250/208.1; 250/214 R; 250/214 DC; 348/294; 348/297; 341/155

(58) Field of Classification Search ........... 250/208.1, 250/214 R, 214.1, 214 DC; 348/294–324; 257/290–293; 341/155, 158, 165, 169, 172
See application file for complete search history.

(56) References Cited

U.S. PATENT DOCUMENTS 5,909,026 A * 6/1999 Zhou et al. ............ 250/208.1
6,369,737 B1   4/2002 Yang et al.
6,538,593 B2   3/2003 Yang et al.
6,704,046 B2 * 3/2004 Dyas et al. ............ 348/223.1
7,202,463 B1 * 4/2007 Cox .................... 250/214 R

OTHER PUBLICATIONS

Kavusi et al., Quantitative Study of High Dynamic Range Image Sensor Architectures, Sensors and Camera Systems For Scientific, Industrial, and Digital Photography Applications V, M. M. Blouke, N. Sampat, R. Motta, eds. Proc. SPIE-IS&T vol. 5301, pp. 264-275, 2004.

Stoppa et al., Novel CMOS Image Sensor With a 132-dB Dynamic Range, IEEE Journal of Solid-State Circuits 37 (12), pp. 1846-1852, Dec. 2002.

(Continued)

Primary Examiner—Georgia Epps
Assistant Examiner—Pascal M Bui-Pho
(74) Attorney, Agent, or Firm—Wolf Greenfield

(57) ABSTRACT

An improved CMOS pixel with a combination of analog and digital readouts to provide a large pixel dynamic range without compromising low-light performance using a comparator to test the value of an accumulated charge at a series of exponentially increasing exposure times. The test is used to stop the integration of photocurrent once the accumulated analog voltage has reached a predetermined threshold. A one-bit output value of the test is read out of the pixel (digitally) at each of the exponentially increasing exposure periods. At the end of the integration period, the analog value stored on the integration capacitor is read out using conventional CMOS active pixel readout circuits.

23 Claims, 6 Drawing Sheets

OTHER PUBLICATIONS

Yang et al., A 640×512 CMOS Image Sensor with Ultrawide Dynamic Range Floating-Point Pixel-Level ADC, IEEE Journal of Solid-State Circuits 34(12), pp. 1821-1834, Dec. 1999.

Decker et al., A 256×256 CMOS Imaging Array with Wide Dynamic Range Pixels and Column-Parallel Digital Output, IEEE Journal of Solid-State Circuits 33(12), pp. 2081-2091, Dec. 1998.

Loinaz et al., A 200-mW, 3.3-V, CMOS Color Camera IC Producing 352×288 24-b Video at 30 Frames/s, IEEE Journal of Solid-State Circuits 33(12), pp. 2092-2103, Dec. 1998.

Chen et al., Adaptive Sensitivity CCD Image Sensor, Proc. SPIE, San Jose, CA Feb. 1995, vol. 2415, p. 303-309.

* cited by examiner

FIGURE 3 – PRIOR ART

MIXED ANALOG AND DIGITAL PIXEL FOR HIGH DYNAMIC RANGE READOUT

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention is related generally to CMOS imaging sensors, and in particular to an improved CMOS imaging sensor having mixed analog and digital pixel readout for high dynamic range.

Solid state image sensors ("imagers") are important in a wide variety of applications including professional and consumer video and still image photography, remote surveillance for security and safety, astronomy and machine vision. Imagers that are sensitive to non-visible radiation, for example infrared radiation, are used in some other applications including night vision, camouflage detection, non-visible astronomy, art conservation, medical diagnosis, ice detection (as on roads and aircraft), and pharmaceutical manufacturing.

An image sensor comprises a two-dimensional array of photosensitive elements (pixels) in combination with control and readout circuitry. The pixels are sensitive to incoming radiation. The control and readout circuitry scans and quantitatively evaluates the outputs from the pixels and processes them into an image.

FIG. 1 is a schematic block diagram and approximate physical layout of a typical conventional CMOS silicon imager. The imager comprises an n row by an m column array of pixels implemented advantageously on a single silicon die. Each pixel contains a photo-detector plus control and multiplexing circuitry. An active pixel is a pixel which also includes signal amplification and processing circuitry. Each pixel generates an output signal that is proportional to the accumulated radiation incident on the photo-detector during a defined integration period.

All the pixels in a single row are controlled by a set of row signals generated by a row multiplexer. The row multiplexer contains circuits that perform row address and timing functions within the pixel including pixel reset and controlling the length of the integration period. All pixels in a single row output onto their respective column bus at the same time, but pixels in different rows can output at different times. This staggering allows the pixels in a column to share the column bus, multiplexing their output signals sequentially onto the column bus one row at a time.

All the pixels in a single column send their output signals to a column multiplexer via the column bus. The pixel output signals are multiplexed onto the column bus in response to control signals from the row multiplexer. Circuits within the column multiplexer can perform a number of functions including amplification, noise reduction and multiplexing into predefined video or image formats, e.g. a standard TV video sequence. The video or image signals generated by the column multiplexer can be further processed by an on-chip image signal processor to reorganize, improve and enhance the image.

FIG. 2 is a circuit schematic of a typical conventional CMOS active pixel, commonly known as a 3-T cell. The pixel comprises a photo-detector, an integration capacitor $C_{int}$, a source follower device M1, a pre-charge device M2, and a row-select device M3. The integration capacitor may simply be the parasitic capacitance of the photo-detector and M1. The active pixel is controlled by two row signals, pre-charge and row-select. It also connects to the column output bus which is terminated in the column multiplexer with a current source or other suitable load device.

At the beginning of an integration cycle, a pulse on the pre-charge line charges the integration capacitor to a known value via M2. During the integration period, photocurrent generated by the photo-detector in response to incident radiation discharges the integration capacitor. This causes the voltage $V_s$ on the gate of M1 to change. The change in voltage $\Delta V$, is a function of the accumulated photo-charge $\Delta Q$ and the integration capacitance $C_{int}$ according to $\Delta V_s = \Delta Q / C_{int}$. The ratio of output voltage to accumulated charge $\Delta V_s / \Delta Q = 1/C_{int}$ is known as the conversion gain. At the end of the integration period, the row-select line is set to allow the voltage $V_s$ to be read out on to the column output bus via M1 and M3. The operation of this type of pixel is well understood by those skilled in the art.

For a given integration period, the minimum optical signal that a pixel can detect is limited by shot noise in the photo-detector, reset noise in the integration capacitor (sometimes known as kTC noise) and electrical noise in the read-out circuitry. The maximum optical signal that a pixel can detect is limited by the charge accumulation capacity of the integration capacitor. Once this limit is reached, the pixel is said to be saturated. The dynamic range of a pixel, typically measured in dB, is the ratio of the maximum optical signal (at saturation) to the minimum optical signal (limited by noise). The dynamic range of a pixel is a measure of the imager's ability to capture both very bright and very dark objects in a single image.

The dynamic range of an imager is the ratio of the maximum optical signal that can detected without pixel saturation to the minimum optical signal that can be detected, allowing for changes in integration time and aperture. The dynamic range of an imager can be much larger than the dynamic range of the pixel. Note, however, that modifications to operation of the imager such as integration time and aperture affect all of the pixels in an imager equally. They allow an imager to operate in very bright light or under very low light conditions. They do not, however, improve an imager's ability to capture very bright and very dark objects in the same scene.

There are a number of applications of CMOS imagers that require very high dynamic range within a single scene. An example is an automotive night vision camera in which a scene to be processed may include both very dark objects (e.g. animal or pedestrian on the road at night) and very bright objects (oncoming car headlamps). Another example is a security camera which is used to identify a poorly lit person against a bright sunlit background. These applications require an imager in which the pixel has a very high dynamic range (e.g. 100 dB). The pixels used in CMOS cameras (for example, the pixel shown in FIG. 2) typically have a pixel dynamic range of 70 dB or less. They are not suitable, therefore, for these high dynamic range applications. For these applications, a pixel with increased dynamic range is required.

An obvious approach to increasing the dynamic range of a pixel is to increase the value of the integration capacitor. This increases the saturation level of the pixel. Unfortunately, it also reduces the conversion gain of the pixel which reduces sensitivity of the imager and therefore the signal to noise ratio at low light levels. So the net improvement in dynamic range may be small. Increasing the size of the integration capacitor also causes the area of the pixel to increase significantly to accommodate the extra capacitance.

One technique that has been proposed for increasing the dynamic range of pixels is to use a non-linear element to compress the output of the pixel. The photodetector current may, for example, be fed into a logarithmic current to voltage converter such as a diode-connected MOS transistor. While such devices can achieve very high dynamic range, they suffer from poor sensitivity, low signal to noise ratio and exhibit high levels of fixed pattern noise.

A second technique uses conventional charge accumulation when the illumination level is low but records the 'time to saturation' under high levels of illumination. Once a nominal saturation level is achieved, a comparator switches to sample the voltage of an analog ramp that is supplied to every pixel. The sampled voltage provides a measure of the time instant when saturation occurred. This scheme requires a low noise analog ramp and precision components within the pixel to achieve low noise. It also suffers from high power dissipation because the precision comparator is "always on".

A third technique uses an overflow gate to dynamically adjust the saturation level during integration. In a conventional 3-T pixel, the gate of the pre-charge device is pulsed "high" at the beginning of the integration cycle and then held "low" during the integration period. By placing a small positive control voltage on the gate of the pre-charge device during the integration period, one can effectively lower the saturation level of the pixel. During the initial portion of the integration period, the saturation level is set low. Once saturation is reached, any additional photocurrent is drained away through the pre-charge device. After a predetermined interval, the saturation level is raised. Charge can then once again accumulate until the new saturation level is reached. The saturation level is monotonically increased in steps during the integration period in such as way as to create a well defined non-linear charge to voltage relationship. This scheme enhances dynamic range at the expense of reduced signal to noise ratio due to an effectively reduced charge storage capacity.

A fourth technique proposes a reset gate to drain optical charge from the photo-detector. By selectively activating the reset gates of individual pixels, one can individually set the effective integration time of each pixel. This technique was proposed for use with CCD imagers. It could also be applied to CMOS imagers. However, control of the reset gate is external to the pixel array. It thus requires considerable external circuitry to remember the recent activity of each pixel and then a complex 2-D addressing scheme within the array to individually control the reset gate of each pixel.

It has further been suggested to employ a multiple sampling technique based on pixel level analog-to-digital (A/D) conversion. The in-pixel A/D converter uses a technique known as multi-channel bit-serial (MCBS) to convert the analog output of the pixel to a Gray code digital output. A block diagram of the A/D converter is shown in FIG. 3. It comprises a comparator, and a D-latch. This circuit generates one bit of the Gray code digital output Dout at a time. The voltage to be converted Ain is supplied to one input of the comparator. An analog ramp Aramp is supplied to the other input of the comparator. An m bit Gray coded digital ramp Dramp, whose digital value at any time t corresponds to the value of the analog ramp at time t is also provided. The $i^{th}$ bit of the digital output $Dout_i$ is determined by supplying $Dramp_i$ to the D input of the latch. $Dramp_i$ is a binary digital waveform whose value at any time t is equal to the $i^{th}$ bit of the digital Gray code ramp. When Aramp is equal to the input value Ain, the comparator switches and stores the appropriate digital value into the latch. This process is performed for each of the m bits of the digital output. Gray code is used so as to minimize errors that would be caused by small changes in the input while generating a multi-bit digital output.

The output of the pixel is sampled by the A/D converter at a series of k exponentially increasing integration times T, 2T, 4T, . . . , $2^k$T. The digitized output of the A/D converter will approximately double each time until saturation is reached. Suppose that saturation is first detected when performing the $j^{th}$ conversion, that is, after time $2^j$T. The output of the pixel is then the m bit output of the A/D converter after the $(j-1)^{th}$ conversion (last output prior to saturation) multiplied by a scale factor $2^{k-j+1}$ to account for the reduced integration time. This scheme has the advantage that all A/D conversion is performed inside the pixel; no analog output is required. It also increases the dynamic range of the pixel by a factor of $2^k$ while providing m bits of resolution at all levels of illumination.

With this approach, it is not necessary to output all m bits at each sampling instant. All m bits are output at the first sampling instant (at time T). Assuming the charge to voltage response of the pixel is linear, the output at time 2T will be double the output at time T. Once the scaling factor is applied, the outputs will be identical except for the least significant bit (LSB). This LSB is the one bit of added precision that has been obtained by doubling the integration time. After the first integration time, therefore, it is only necessary to output the LSB of the m bit digital output. Each subsequent sampling instant yields another bit of the digital output until saturation is reached.

There are, however, a number of problems associated with this scheme. Firstly, the accuracy of the digital readout requires that the optical illumination be constant over the integration period and that the conversion from light to charge and charge to voltage be linear. Variations in illumination and/or non-linearities in the circuit invalidate the assumption that the output at time 2T will be double the output at time T and hence the property that only the LSB of the converted output will change after the first sample. Small non-linearities, for example, can cause inconsistencies between the output bits in successive samples which can, in turn, cause (potentially large) errors in the digital readout. Secondly, the sensitivity of the pixel is limited by the resolution of the MCBS converter which is, in turn, limited by the gain-bandwidth product of the comparator and the accuracy of the analog and digital ramps. Area and power limitations within the pixel preclude the use of a high-gain, high-bandwidth comparator. Quantization noise in the converter is therefore likely to be much greater than kTC noise or the analog read-out noise that would be found in a conventional imager. This will likely limit the use of this type of pixel in low-light conditions.

Accordingly, it would be advantageous to provide a CMOS imaging sensor with a pixel design which has a large dynamic range without compromising low-light performance.

BRIEF SUMMARY OF THE INVENTION

Briefly stated, the present invention provides an improved CMOS pixel with a combination of analog and digital readouts to provide a large pixel dynamic range without compromising low-light performance. The pixel design uses a comparator to test the value of an accumulated charge at a series of exponentially increasing exposure time intervals. A one-bit output value of the test is read out of the pixel (digitally) at each of the exponentially increasing exposure periods, with a first value representing an accumulated charge below a predetermined threshold, and a second value representing an accumulated charge equal to or exceeding the predetermined threshold. At the end of the integration period, the analog value stored on the integration capacitor at the end of the time interval in which the accumulated charge equaled or exceeded the predetermined threshold is read out using conventional CMOS active pixel readout circuits.

In one embodiment, the improved CMOS pixel includes a photo-detector, an integration capacitor, a source follower device, a pre-charge device, and a row-select device. In addition, the CMOS pixel includes a clocked comparator, an RS flip-flop, a photocurrent switch device, and a digital row-select device. The CMOS pixel is controlled by four row signals: pre-charge, sample, analog-row-select and digital-row-select, and is connected to two column output lines: the analog column bus and the digital column bus.

The foregoing features, and advantages of the invention as well as presently preferred embodiments thereof will become more apparent from the reading of the following description in connection with the accompanying drawings.

BRIEF DESCRIPTION OF THE SEVERAL
VIEWS OF THE DRAWINGS

In the accompanying drawings which form part of the specification:

Corresponding reference numerals indicate corresponding parts throughout the several figures of the drawings. It is to be understood that the drawings are for illustrating the concepts of the invention and are not to scale.

DESCRIPTION OF THE PREFERRED
EMBODIMENT

The following detailed description illustrates the invention by way of example and not by way of limitation. The description enables one skilled in the art to make and use the invention, and describes several embodiments, adaptations, variations, alternatives, and uses of the invention, including what is presently believed to be the best mode of carrying out the invention.

In general, an improved CMOS pixel of the present invention utilizes a combination of analog and digital readout to provide a large pixel dynamic range without compromising low-light performance using a comparator to test the value of accumulated charge at a series of exponentially increasing exposure times. Analog to digital conversion is not performed within the pixel. The test is used to stop the integration of photocurrent once the accumulated analog voltage has reached a predetermined threshold. The one-bit output value of the test is read out of the pixel (digitally) at each of the exponentially increasing exposure periods. At the end of the integration period, however, the analog value stored on the integration capacitor is read out using conventional CMOS active pixel readout circuits. The accuracy of the output is not a function of the precision of the comparator and there is no quantization noise to limit low-light performance.

Figure 1:
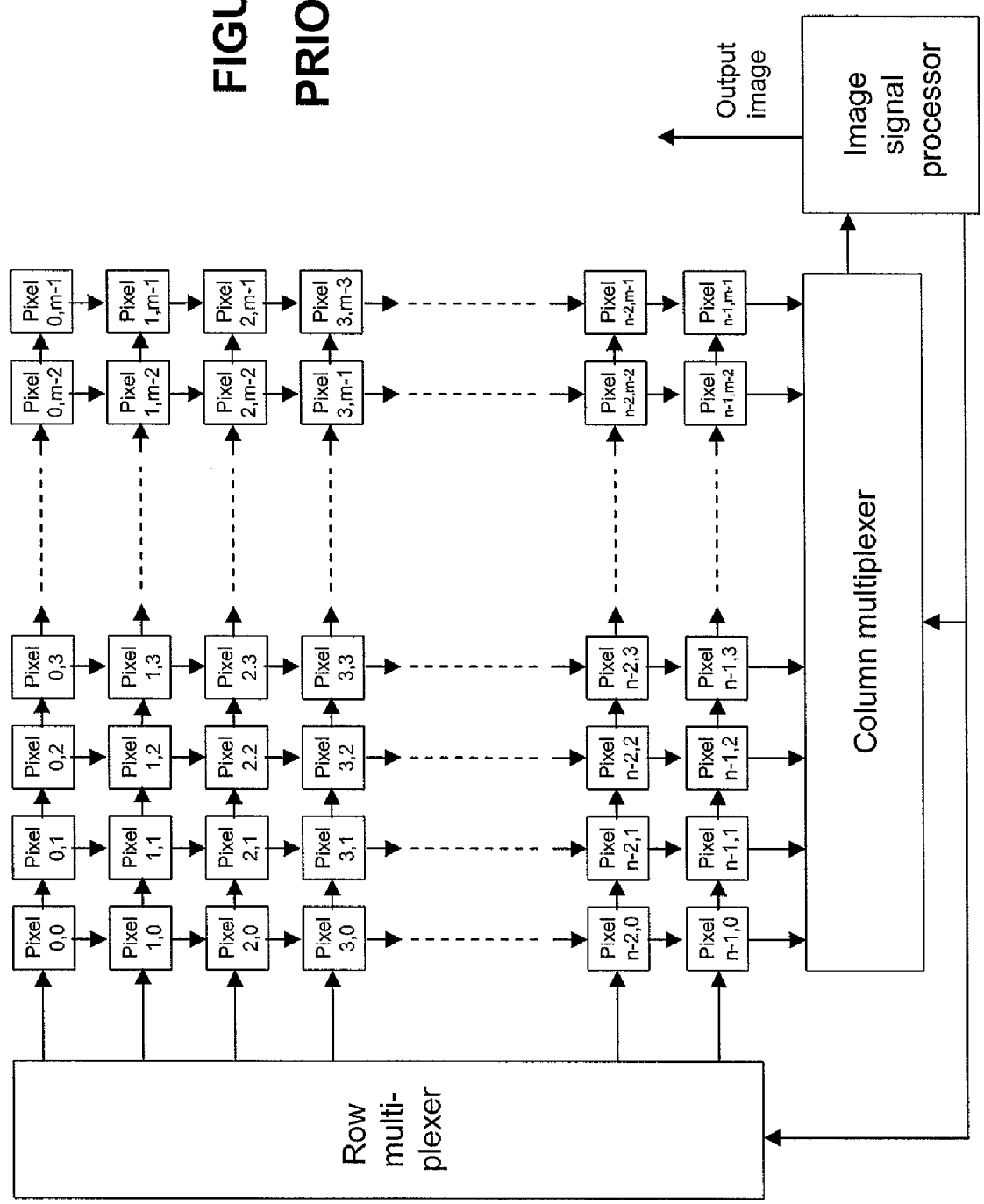
FIG. 1 is a schematic block diagram of a prior art conventional CMOS silicon imager.
Figure 2:
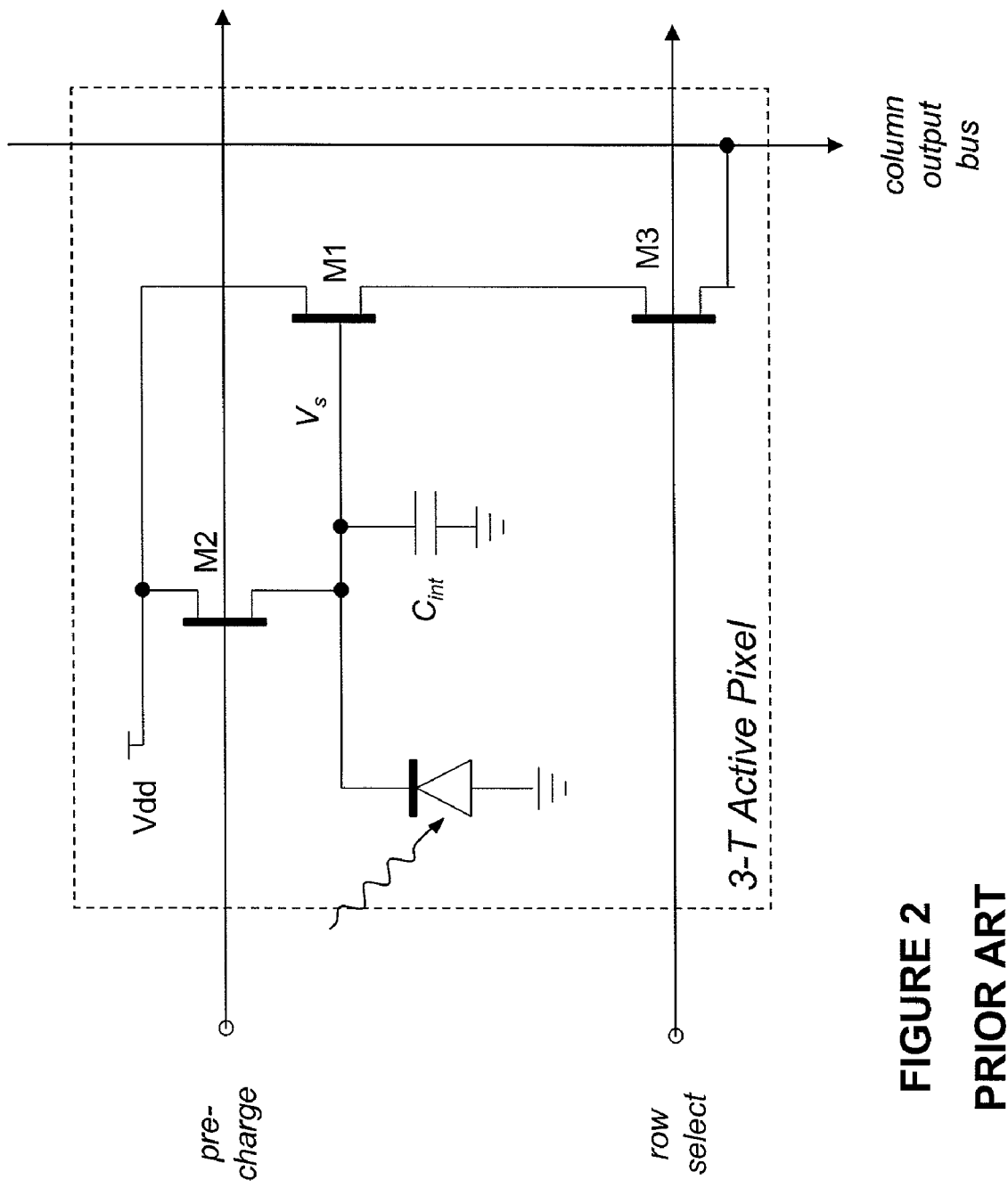
FIG. 2 is a circuit schematic of a prior art CMOS active pixel.
Figure 3:
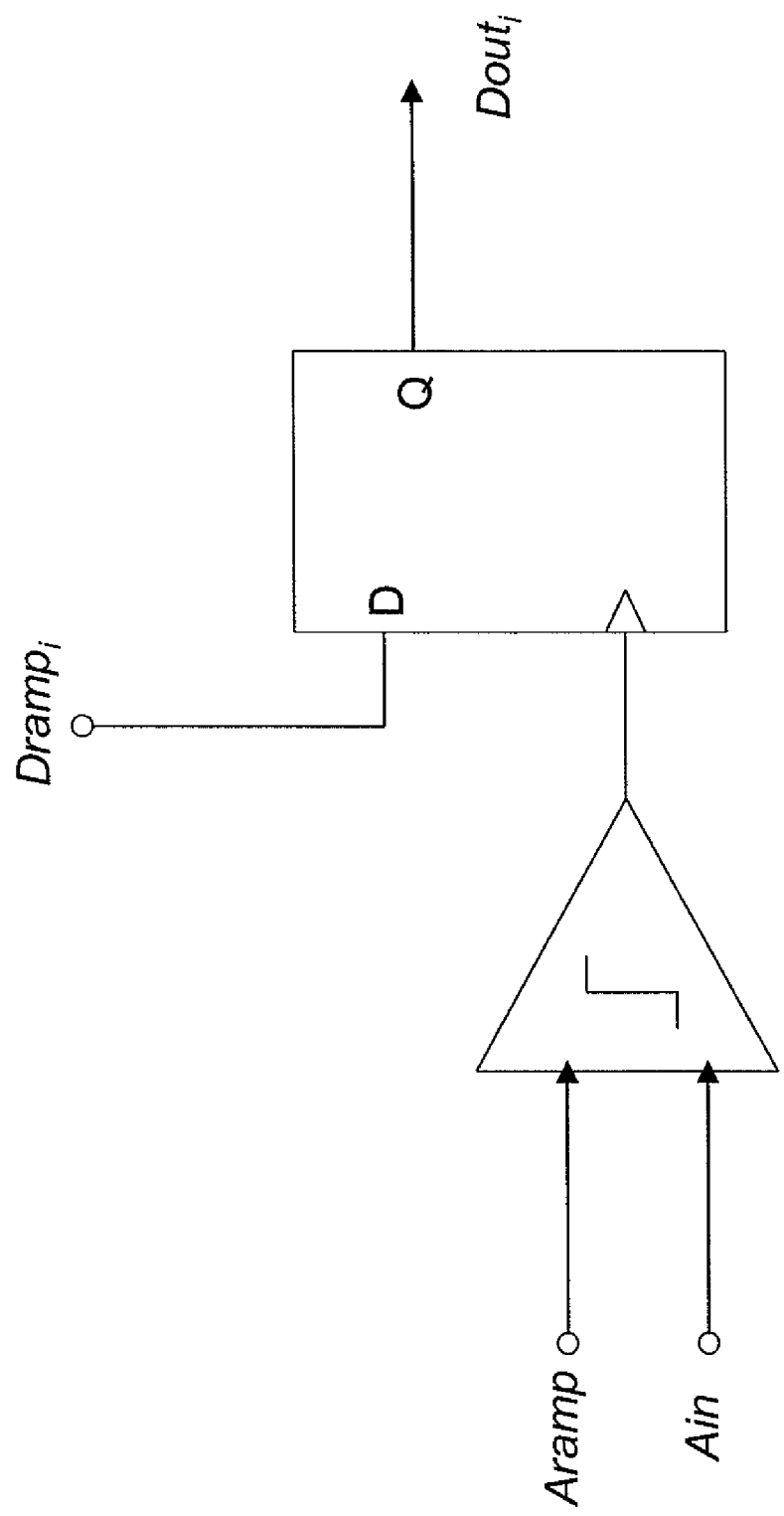
FIG. 3 is a block diagram of a prior art CMOS pixel A/D converter.
Figure 4:
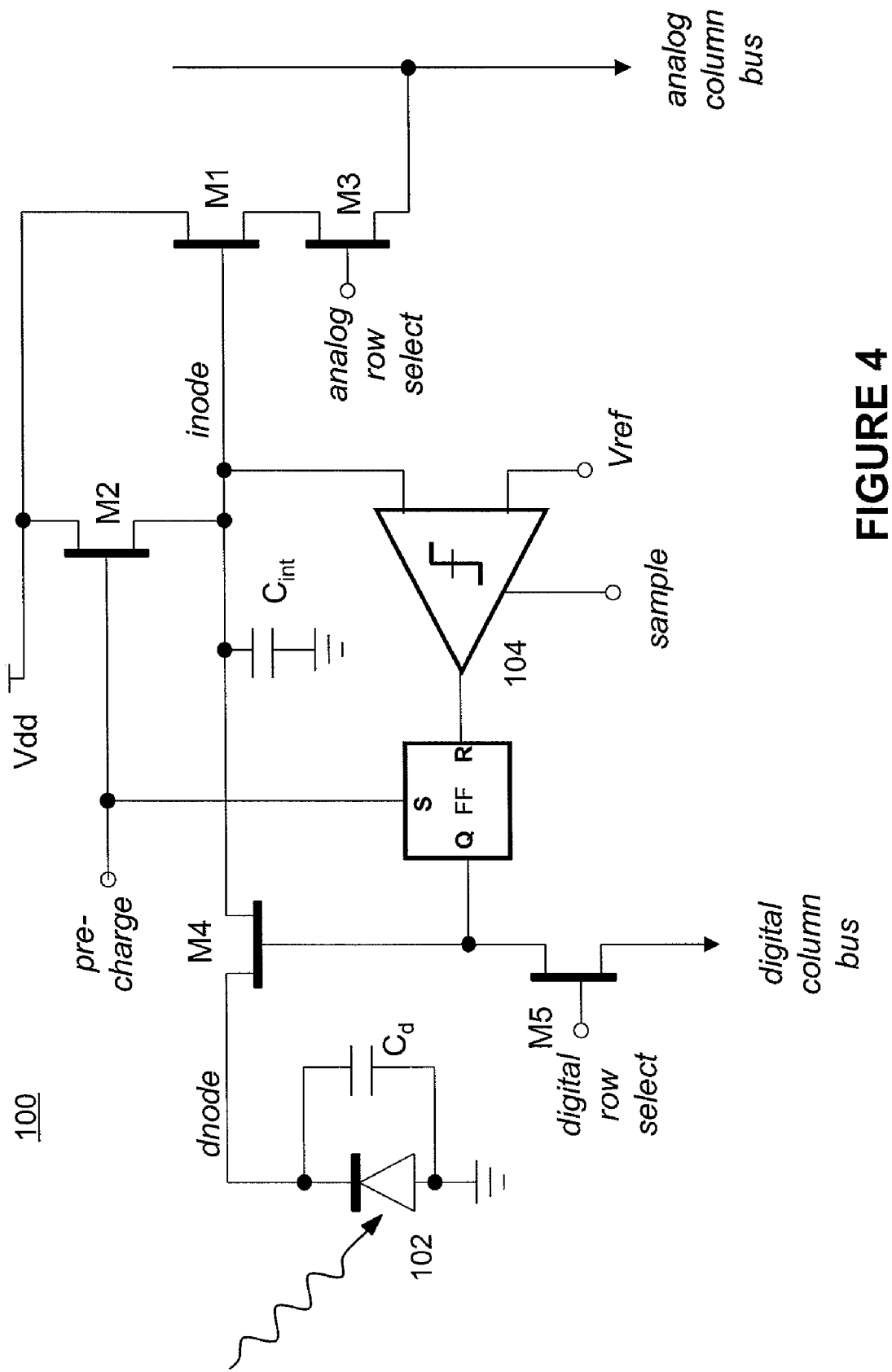
FIG. 4 is a block diagram of an embodiment of the CMOS pixel of the present invention.

A block diagram of an embodiment of the pixel of the present invention is shown generally at 100 in FIG. 4. Like the 3-T pixel, the embodiment of the pixel of the present invention comprises a photo-detector 102, an integration capacitor $C_{int}$, a source follower device M1, a pre-charge device M2, and a row-select device M3. In addition, it includes a clocked comparator 104, an RS flip-flop FF, a photocurrent switch device M4, and a digital row-select device M5. The pixel 100 is controlled by four row signals: pre-charge, sample, analog-row-select, and digital-row-select. It also connects to two column output lines: the analog column bus and the digital column bus.

At the beginning of an integration period for the pixel 100, the pre-charge signal sets RS flip-flop FF, enabling pass transistor M4. As in a conventional active CMOS pixel, the pre-charge signal also charges nodes dnode and inode via M2 and M4. Once the pre-charge signal is released, photocurrent begins to discharge inode via M4. At well defined exponentially increasing sub-integration times T, 2T, 4T, . . . etc., the signal sample triggers the comparator 104 to compare the accumulated signal at inode to a predetermined threshold Vref. Vref is chosen so that the RS flip-flop FF will reset when the integrating node inode has reached not quite 50% of its overall charge holding capacity. After each comparison event, the digital-row-select signal is pulsed. This causes the output of RS flip-flop FF to be read out over the digital column bus via M5. Once RS flip-flop FF has been reset by one of these comparison events, M4 is turned off. This isolates the photodiode from inode, thereby stopping the integration of photocurrent. At the end of the total integration period, the accumulated analog charge on inode is read out over the analog column bus via M3 in the conventional manner.

The output of each pixel 100 is thus a series of single bit digital outputs (one for each sub-integration period) plus an analog output. The integration of photocurrent within the pixel 100 is stopped whenever the accumulated charge is more than 50% of capacity. Since each sub-integration period is double the previous period, this ensures that the integrated signal on inode never exceeds 100% of capacity (unless the optical signal is so strong that it saturates the pixel in the first sub-integration period T). The digital output sequence records when integration was stopped, and may be used to generate what is effectively an exponent qualifying the analog output (mantissa).

Figure 5:
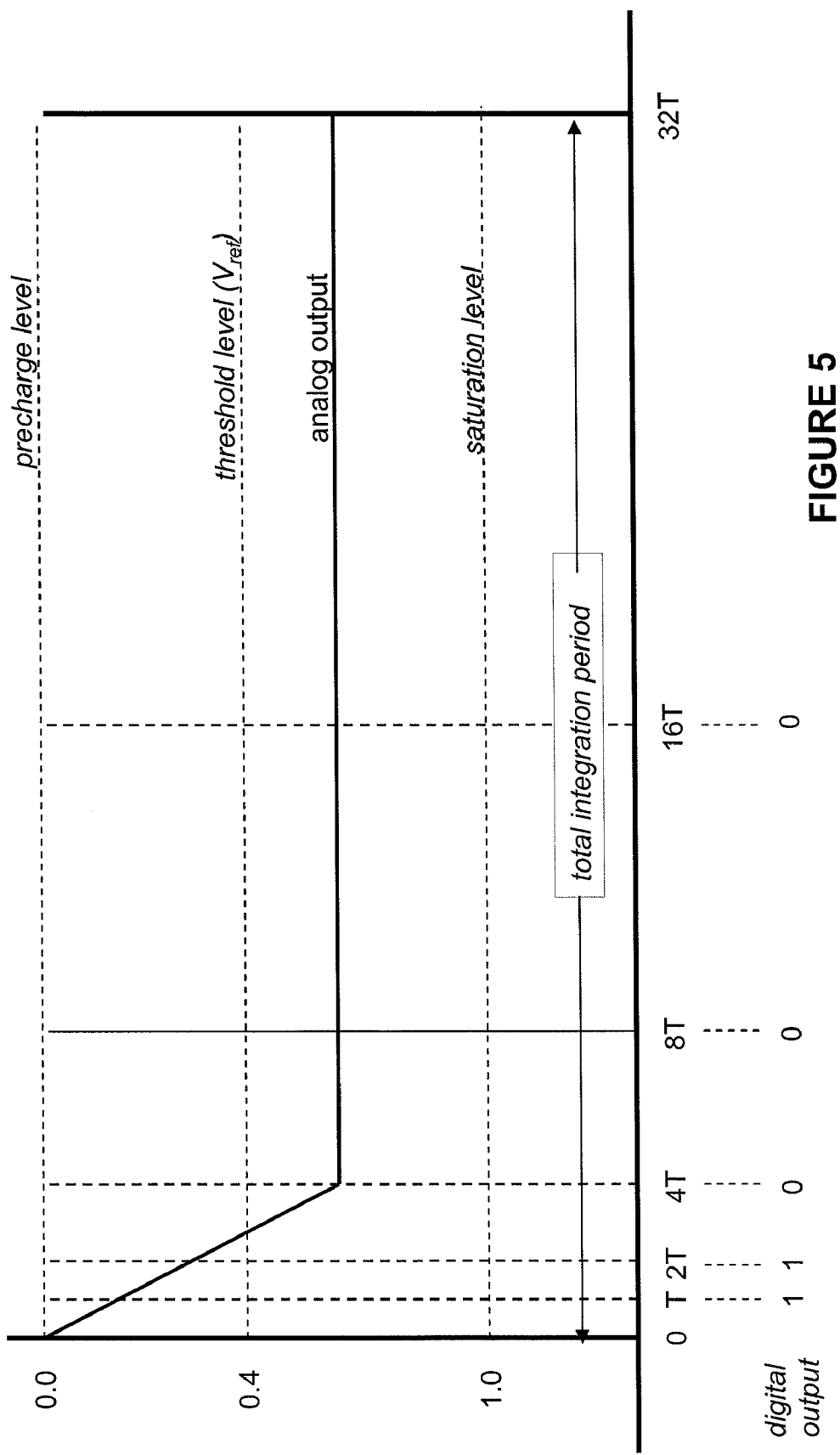
FIG. 5 is a timing diagram showing an example of the operation of the CMOS pixel of the present invention.

For example, assume that a pixel has an analog output range of 0 (precharge) to 1.0 (saturation) and that the total integration period is 32T. The accumulated charge is tested at times T, 2T, 4T, 8T and 16T as shown in FIG. 5. Further assume that the threshold voltage is set to stop integration when the accumulated charge reaches 40% of capacity, and that the optical signal is such that it would normally saturate the pixel 100 in time 6T. At the end of the first sub-integration period T, the pixel 100 will be at 17% of capacity, so the comparator does not fire and the RS flip-flop FF remains set. The digital output is 1. At the end of the second sub-integration period 2T, the pixel 100 is at 33% of capacity, so the comparator does not fire and the RS flip-flop FF remains set. The digital output is again 1. At the end of the third integration period 4T, the pixel is at 67% of capacity, so the comparator does fire and resets the RS flip-flop FF which stops the integration. The digital output for this and all remaining sub-integration periods is 0.

At the end of the total integration period the analog output 0.67 is read out. The digital output sequence is 11000. This indicates that the analog output of 0.67 was accumulated in a time period of 4T. The scaled pixel output is thus $(32 \div 4) \times 0.67$, which equals 5.33. This represents the signal that would have been accumulated in a time period of 32T if the integration capacity were not limited. Note that the maximum signal that can be measured in this example is one that just saturates the pixel in time period T. This example represents a 32 times increase in the dynamic range of the pixel 100 compared to a 3-T pixel with the same charge accumulation capacity. For optical signals not high enough to switch the comparator at any point during the total integration period, the SNR remains the same as the original 3-T pixel. For optical signals high enough to switch the comparator, the final analog signal will always lie somewhere between 40% and 80% of capacity. Maximum SNR has therefore only been reduced by 20%.

The technique of the present invention increases dynamic range of the pixel 100 without significantly reducing the maximum SNR, and does not perform in-pixel A/D conversion. The accuracy is not limited by the precision and speed of the comparator 104 nor the threshold voltage. Low-light performance is limited only by shot noise and analog read-out noise. There will be kTC noise associated with the reset of inode, but this can be removed using external digital correlated doubled sampling as with a conventional active pixel. In contrast, kTC noise (as opposed to offset errors) cannot be removed from prior art pixel designs incorporating in-pixel analog-to-digital conversion because it is too small to be detected by the in-pixel A/D technique.

The technique of the present invention assumes that the charge to voltage versus time process is linear, and small non-linearities do not produce large errors. The technique does not depend on an arithmetic relationship between the values of the digital output bits. The output bits simply define when integration was stopped. The output will always be a sequence of ones followed by a sequence of zeros—giving an unambiguous measure of integration period. Similar to a conventional active CMOS pixel, the accuracy of the pixel 100 output is purely a function of the linearity and accuracy of the analog output. The digital signals merely scale the output by capturing the value of the optical integration period.

The photocurrent switch M4 will add charge-feed through and kTC noise to the final output. Under low light conditions, the comparator 104 will never fire and so M4 remains conducting. The presence of M4 does not, therefore affect the low light performance of the pixel. Charge-feed through and kTC noise due to M4 will only occur under conditions when inode is at least 50% of capacity, at which point they will not significantly affect the signal to noise ratio.

Figure 6:
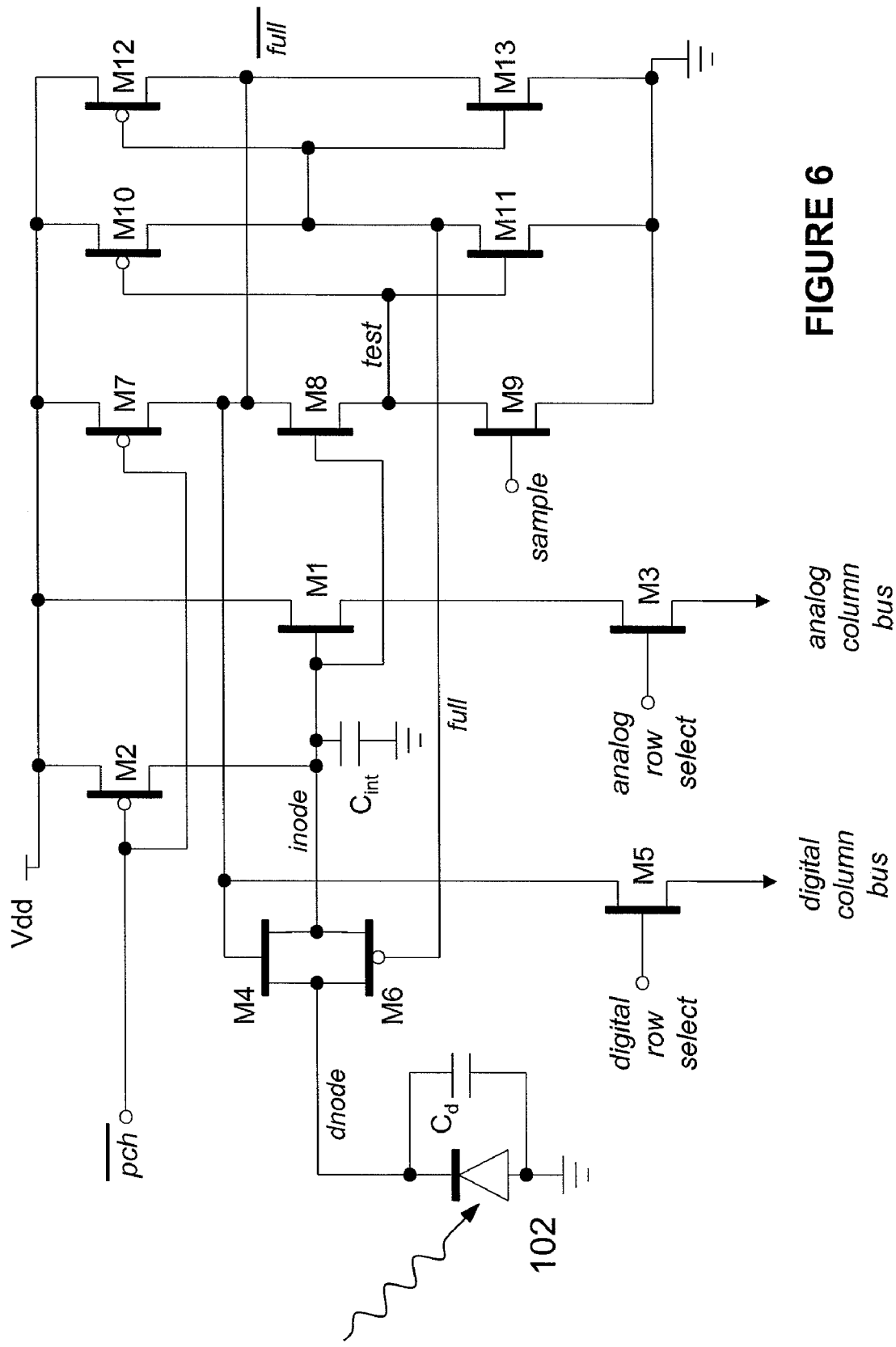
FIG. 6 is a circuit schematic of an embodiment of the CMOS pixel of the present invention.

A challenge in implementing this new pixel is to provide the functionality of FIG. 4 without significantly increasing the complexity of the pixel circuitry which would, in turn, significantly reduce the fill factor. FIG. 6 shows one possible CMOS implementation of the pixel 100 of the present invention. Those of ordinary skill in the art will recognize that other circuit configurations which accomplish the same functionality may be implemented without departing from the scope of the invention, and may have lesser or greater fill factors.

As in the 3-T pixel, the new pixel 100 comprises a photo-detector 102, an integration capacitor $C_{int}$, a source follower device M1, a pre-charge device M2, and an analog row-select device M3. M4 and M5 function as a complimentary CMOS switch controlled by signals full and $\overline{\text{full}}$ which disconnect the photodiode from the integration node inode once the pixel 100 is deemed full.

The device pairs M10/M11 and M12/M13 form two inverters which act as a comparator within the pixel 100. The switching voltage of the comparator (Vref in FIG. 4) is simply the switching voltage of inverter M10/M11 which is determined by the relative sizes of devices M10 and M11. These will, of course, vary according to process variations across the imager. As pointed out previously, however, the correct operation of the pixel 100 does not depend on the exact switching voltage of the comparator.

A second source follower device M8 is terminated by a switched current source load device M9. When M9 is conducting, the output of M8, test, is a replica of the analog output voltage that will be produced by the regular source follower device M1. The signal test connects to the input of the comparator.

At the beginning of the integration cycle, the input sample is set low, turning off device M9. The pre-charge signal $\overline{\text{pch}}$ is taken low, causing dnode, inode, and the signal $\overline{\text{full}}$ to be all set high. This, in turn, causes the signal test to be set above the comparator threshold which also drives $\overline{\text{full}}$ high. Once $\overline{\text{pch}}$ is taken high, the comparator latches into the "not full" state due to the positive feedback supplied through device M8.

At well defined exponentially increasing sub-integration times T, 2T, 4T, . . . etc., the signal sample momentarily switches to a small positive voltage, sufficient to cause M9 to act as a current source load to M8. The signal test will then be equal to the signal inode minus the threshold voltage of M8. If little optical charge has accumulated on inode, the voltage of test will be above the comparator threshold and the comparator/latch formed by the devices M10 through M13 will remain in their preset state.

However, if the node inode has accumulated sufficient charge to be near 50% of its capacity, the voltage at test will be low enough to cause M10/M11 to switch, causing full to go high. This will, in turn, cause M12/M13 to switch which will cause $\overline{\text{full}}$ to go low. This will disconnect the photodetector 102 from inode by turning off M4 and M6, thereby preventing any further accumulation of optical charge. When $\overline{\text{full}}$ goes low, it also lowers the drain of M8 latching the comparator into the full state. Once this has occurred, the comparator/latch will not reset into the $\overline{\text{full}}$ state until a $\overline{\text{pch}}$ pulse is applied at the beginning of the next integration cycle.

A digital row select signal is supplied to read the digital output of the comparator/latch via switch device M5 after each sample event. At the end of the integration period, the analog row select line causes the accumulated analog charge on inode to be read out in the usual fashion via switch device M3.

Note that for most of the integration period, the signal sample is held low. This is to reduce power dissipation in the pixel 100 by turning off load device M9. It is only pulsed to a small positive voltage when a comparison needs to be made.

As various changes could be made in the above constructions without departing from the scope of the invention, it is intended that all matter contained in the above description or shown in the accompanying drawings shall be interpreted as illustrative and not in a limiting sense.

The invention claimed is:

1. An improved CMOS pixel having a photo-detector configured to generate a photocurrent in response to incident radiation, and an integration capacitor for accumulating a charge associated with the generated photocurrent over an integration period, and an analog output circuit for generating an analog signal representative of the accumulated charge over the integration period, wherein the improvement comprises:
   a comparator circuit configured to compare the accumulated charge in the integration capacitor with a reference level at discrete sub-integration intervals within said integration period;
   a digital output circuit operatively coupled to an output of said comparator circuit, said digital output circuit configured to generate a digital signal representative of the comparison of accumulated charge in the integration capacitor with said reference level; and
   wherein a sequence of said digital signals associated with said discrete sub-integration intervals of the integration period is used to scale said analog signal at an end of the integration period to output a scaled pixel output.

2. The improved CMOS pixel of claim 1 wherein said digital output circuit is further configured to stop an accumulation of charge in the integration capacitor in response to an output of said comparator circuit indicating said accumulated charge exceeds said reference level.

3. The improved CMOS pixel of claim 2 wherein a sequence of said digital signals over said integration period identifies a discrete sub-integration interval at which an accumulation of charge in the integration capacitor exceeds said reference level.

4. The improved CMOS pixel of claim 2 wherein said digital output circuit is configured in an initial state to generate a first digital signal representative of said reference level exceeding said accumulated charge; and
   wherein said digital output circuit is configured to generate a second digital signal responsive to a signal from said comparator circuit indicating said accumulation of charge in the integration capacitor exceeds said reference level.

5. The improved CMOS pixel of claim 4 wherein said first and second digital signals are one-bit digital signals.

6. The improved CMOS pixel of claim 2 wherein said discrete sub-integration intervals increase exponentially over said integration period.

7. The improved CMOS pixel of claim 2 wherein said digital output circuit includes a flip-flop, an input to said flip-flop coupled to an output from said comparator circuit, and an output from said flip-flop coupled to a digital bus and to a photocurrent switch associated with said integration capacitor.

8. The improved CMOS pixel of claim 2 wherein said comparator circuit is a clocked comparator configured to receive an external sample signal, said external sample signal triggering said comparator circuit to compare said accumulated charge received on a first input to said reference level at each of said discrete sub-integration intervals; and
   wherein said comparator circuit is configured to generate an output signal in response to said accumulated charge exceeding said reference level during said comparison.

9. The improved CMOS pixel of claim 1 wherein said digital output circuit is configured in an initial state to generate a first digital signal representative of said reference level exceeding said accumulated charge; and
   wherein said digital output circuit is configured to generate a second digital signal responsive to a signal from said comparator circuit indicating said accumulation of charge in the integration capacitor exceeds said reference level.

10. The improved CMOS pixel of claim 9 wherein said first and second digital signals are one-bit digital signals.

11. The improved CMOS pixel of claim 1 wherein said discrete sub-integration intervals increase exponentially over said integration period.

12. The improved CMOS pixel of claim 1 wherein said digital output circuit includes a flip-flop, an input to said flip-flop coupled to an output from said comparator circuit, and an output from said flip-flop coupled to a to a digital bus and to a photocurrent switch associated with said integration capacitor.

13. The improved CMOS pixel of claim 12 wherein said photocurrent switch is coupled between the photodiode and the integration capacitor, whereby opening of said photocurrent switch isolates the integration capacitor from the photodiode.

14. The improved CMOS pixel of claim 1 wherein said comparator circuit is a clocked comparator configured to receive an external sample signal, said external sample signal triggering said comparator circuit to compare said accumulated charge received on a first input to said reference level at each of said discrete sub-integration intervals; and
   wherein said comparator circuit is configured to generate an output signal in response to said accumulated charge exceeding said reference level during said comparison.

15. A method for extrapolating a high dynamic range scaled pixel output from a pixel having a low dynamic range analog output signal, comprising:
   at each of a plurality of discrete sub-integration intervals over an integration period, comparing an analog output signal at an integration capacitor which is representative of incident radiation on a photo-detector of the pixel with a reference level to generate a sequence of one-bit digital output signals, wherein
   (a) responsive to said analog output signal being less than said reference level, generating a first one-bit digital output signal, and
   (b) responsive to said analog output signal exceeding said reference level, generating a second one-bit digital output signal and holding said analog output signal at a current level; and
   modifying said analog output signal at an end of said integration period using said sequence of said one-bit digital output signals over said integration period to output a high dynamic range scaled pixel output.

16. The method of claim 15 wherein said step of modifying includes generating an exponent qualifying said analog output signal at the end of said integration period from said sequence of one-bit digital output signals.

17. The method of claim 15 wherein said step of holding said analog output signal at a current level includes disconnecting said integration capacitor from said photo-detector.

18. The method of claim 15 wherein said sequence of one-bit digital signals identifies a discrete sub-integration interval within said integration period at which said analog output signal exceeded said reference level.

19. The method of claim 15 wherein each of said discrete sub-integration intervals increases exponentially.

20. The method of claim 19 wherein an increase in dynamic range of said pixel output is proportional to a ratio of the total integration period to the smallest sub-integration interval of the plurality of discrete sub-integration intervals.

21. The method of claim 15 wherein said reference level is selected to be between 40% and 50% of a maximum of said analog output signal.

22. The method of claim 15 wherein said reference level is selected in relation to an anticipated constant instant radiation over said integration period.

23. The method of claim 22 wherein said reference level is selected such that if said analog output signal exceeds said reference level during a discrete sub-integration interval, said analog output signal will remain below a maximum limit during a next consecutive discrete sub-integration interval.

* * * * *